(No Model.)
J. A. CRISP & G. F. WEBB.
BODY BATTERY AND ATTACHMENTS FOR THE SAME.
No. 448,128. Patented Mar. 10, 1891.
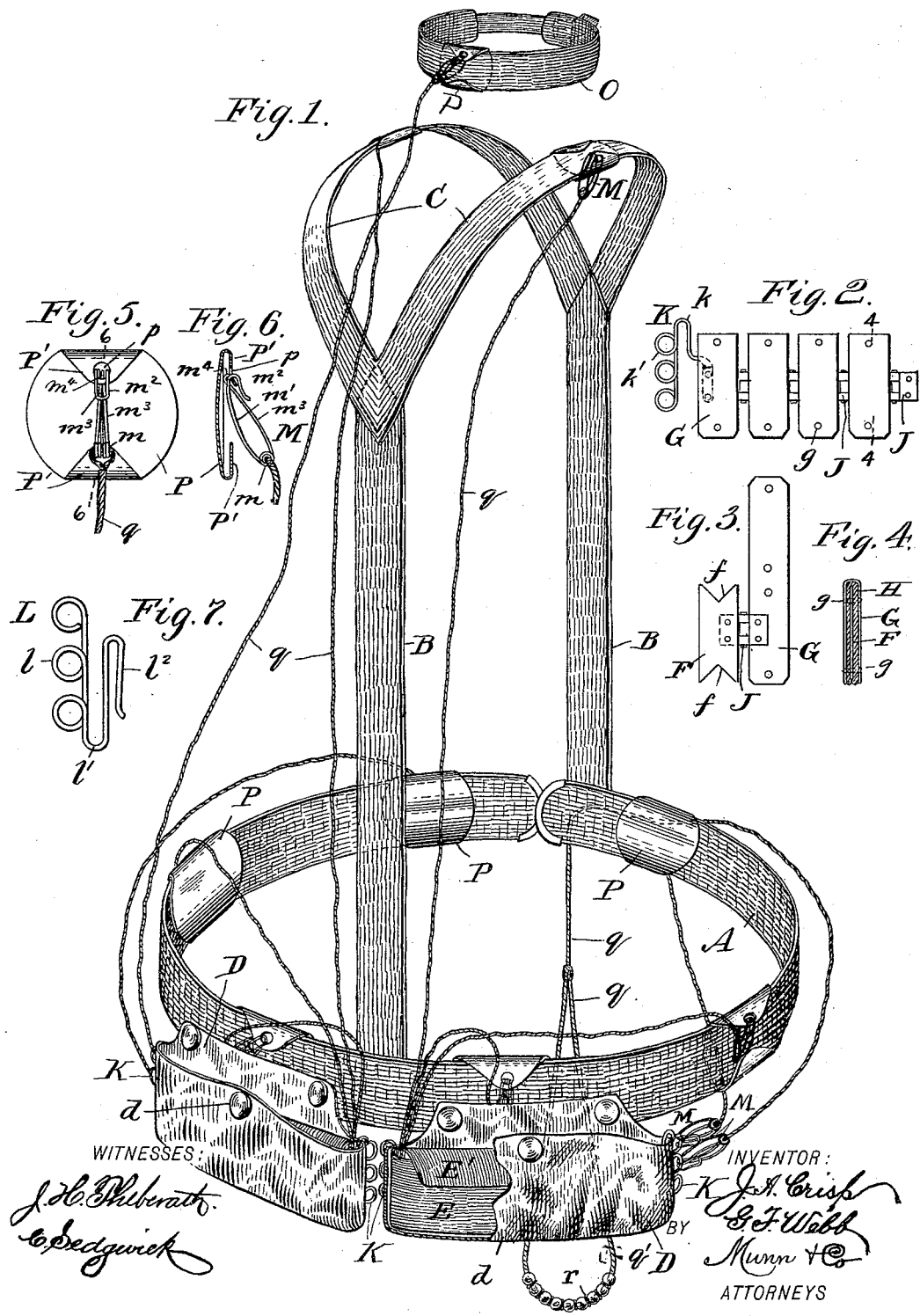

UNITED STATES PATENT OFFICE.

JOHN A. CRISP AND GEORGE F. WEBB, OF JEFFERSON, OHIO.

BODY-BATTERY AND ATTACHMENTS FOR THE SAME.

SPECIFICATION forming part of Letters Patent No. 448,128, dated March 10, 1891.

Application filed November 21, 1890. Serial No. 372,125. (No model.)

*To all whom it may concern:*

Be it known that we, JOHN A. CRISP and GEORGE F. WEBB, of Jefferson, in the county of Ashtabula and State of Ohio, have invented a new and Improved Body-Battery and Attachments for the Same, of which the following is a full, clear, and exact description.

Our invention relates to improvements in that class of batteries which are employed to send a current of electricity through the body in the treatment of acute and chronic diseases of various kinds; and the object of our invention is to produce a battery and attachments therefor which may be conveniently carried upon the body and by means of which a constant galvanic current may be sent through any part of the body, and also to produce electrodes which may contact with the body without corroding and without cutting or injuring the body in any way.

To this end our invention consists in certain features of construction and combination of parts, which will be hereinafter described and claimed.

Reference is to be had to the accompanying drawings, forming a part of this specification, in which similar letters of reference indicate corresponding parts in all the figures.

Figure 1 is a broken perspective view of the battery and attachments embodying our invention. Fig. 2 is a detail view of a portion of the battery-cells and the hook for connecting with the same. Fig. 3 is a plan view of the blanks forming one cell of a battery, showing the manner in which the elements of adjoining cells are connected. Fig. 4 is a cross-section through one of the battery-cells on the line 4 4 of Fig. 2. Fig. 5 is a rear elevation of one of the electrodes which contact with the body, showing also a peculiar hook which connects therewith. Fig. 6 is a cross-section of the same on the line 6 6, and Fig. 7 is a detail view of the adjuster.

The belt A is fastened around the body, and the ends of the belt may be provided with any suitable buckle for that purpose, and extending upward from opposite sides of the belt are the straps B, which terminate at the top in a yoke C, which is adapted to embrace the neck and rest upon the shoulders of the wearer and thus support the device. Buttoned to the belt are the cases D, there being as many cases as batteries, and in the present instance there are two, which is a convenient number; but any desired number may be used. The cases are preferably of silk, leather-lined, and are adapted to contain the battery-pockets E, which are water-proof, and are preferably made of cloth-covered rubber, the pockets having a flap E' at the top to fold down and over the batteries.

The batteries are formed of a series of copper and zinc plates and each cell is complete in itself. Each battery is composed, preferably, of nine cells, and the cells are formed of a central copper plate F and an outer zinc plate G. The plates F have V-shaped ends to provide for the passage of the rivets $g$, by which the plates are fastened together, and layers of felt H are placed between the plates F and G, the felt serving the double purpose of insulating the plates from each other and of absorbing acid to run the battery. The plates of zinc G are longer than the copper plates F and are doubled over them, the plates being held together by the rivets $g$, which pass through the opposite sides of the plates G and through the V-shaped ends of the plates F, and they are attached under sufficient pressure to bind the copper plates in place. The several cells are connected by copper hinges J, the copper element of one cell being hinged to the zinc element of the next, and the circuit may thus be cut out at any point by applying the contact-hook or adjuster to one of the hinges, as described below.

The end cells of each battery are provided with hooks K, the hooks at one end of a battery connecting with a copper element and those at the other end with a zinc element. The hook K has a bent portion $k$ to fit over the battery-pocket, and the outer end of the hook terminates in a series of rings $k'$, adapted to engage the contact-hooks of the circuit-wires. The adjuster L is somewhat like the hook K, as it has the rings $l$ to engage the circuit-hooks and the bend $l'$ to pass over the edge of the pocket; but it also has a terminal bend $l^2$, adapted to clasp one of the hinges J of a battery. The adjuster L is made of spring-wire, so that it will maintain a constant pressure upon a hinge, and if a person does not care to take the full strength of a battery the adjuster may be clasped upon a hinge of the battery, so as to cut it out at a desired point, and the circuit-hooks on one end of the wires hooked into the rings $l$. By having several of these rings on the adjuster, as described, a number of wires leading to different parts of the body may be conveniently connected with the battery. To connect with the battery-hooks and with the electrodes which contact with the body, the spring snap-hooks M are used, the hooks being adapted to press constantly on the parts with which they engage, so that there will be no break or variation in the current. The hook M is formed of spring-wire, which is made into a coil at $m$ to form one end of the hook and to give the necessary spring, and extending forward from the coil is a doubled member $m'$, which is formed into a hook $m^2$, and also the parallel members $m^3$, which are made to extend between the wires of the doubled members $m'$, and which terminate at the back of the hook $m^2$ in coils $m^4$. The hook $m^2$ will thus press upon one side of an object to which it is attached, and the coils $m^4$ and members $m^3$ will press against the opposite side.

A band O is used in connection with the battery, the band being adapted to be strapped around the neck or upon a limb and to carry electrodes, as described below. The electrodes P are made of pure coin-silver, that being the best conductor, and also being less liable to injure the body than most other metals, and the electrodes have the sides which are to contact with the body made convex, thus insuring a perfect contact and also preventing the edges from doing injury, the spring of the electrodes also making them easy to the body. The electrodes are doubled over on opposite edges to form the lips P', by means of which they are attached to a belt or band, and one lip has a perforation $p$ to enable it to engage a hook M. The electrodes are arranged upon the belt A, the yoke C, and band O, and any number may be used, according to the nature of the disease to be treated, the electrodes being arranged so as to be opposite the nerve courses and centers of the body, and the electrodes are connected by the wires $q$, which are the ordinary covered copper wires, with the battery. The wires $q$ have a hook M at each end, the hook on one end being connected with one of the battery-hooks and the hook on the other end being connected with an electrode. We will not follow any particular circuit, as it is obvious that the current will pass through one electrode into the body and out through another electrode to the battery, and by reversing the battery the direction of the current in the body may be changed.

We have shown one of the wires $q$ formed into a loop $q'$, on which are a number of bead-like electrodes $r$, and the loop is adapted to be passed around the male organs of generation, so that the current will pass directly through the nerves thereof, the object being to cure certain diseases peculiar to said parts. The bead-like electrodes $r$ will prevent abrasion of the skin, as they will turn, and the skin cannot be caught between them and pinched, as they closely abut one another and no open spaces are ever formed between them. Suitable cone-shaped electrodes may also be connected with the battery to be applied to the anus for the cure of piles and to the vagina for the cure of female complaints.

To prepare the batteries for use, they are dipped, preferably, in cider-vinegar, although other acids may be used. The belt and attachments are then placed upon the body, the batteries are inserted in the pockets, and the connections made between the batteries and the electrodes. The electrodes may be located and connected in accordance with the disease to be treated.

Having thus described our invention, we claim as new and desire to secure by Letters Patent—

1. The battery-cell comprising the copper plate F, having notches $f\,f$ in its ends, the zinc plate G, bent upon itself and inclosing the same, the rivets passed through the two integral members of the zinc plate and notches $f$ to hold plate F in place, and the absorbent material between the zinc and copper plates, substantially as set forth.

2. The battery-cells, each comprising a copper plate F, having notches $f\,f$, a zinc plate G, bent upon itself and inclosing the plate F, rivets passing through the two integral members of the zinc plate and the notches $f$ to hold plates F in place, an absorbent material separating the zinc and copper plates, copper hinges connecting the copper plate of one cell with the zinc plate of the next cell, and hooks connected, respectively, to the copper plate of one end cell and the zinc plate of the opposite end cell, substantially as set forth.

3. In a body-battery, the electrode P, formed of a circular convex plate having its edge at opposite points bent over upon the concave side of the plate, as shown at P' P', one of the integral bent-over portions P' being provided with an aperture $p$, substantially as set forth.

4. The combination, with the electrode formed of a circular convex plate P, having its edge bent over at opposite points upon the concave side of the plate, as at P' P', one of said parts P' having an aperture $p$, of the snap-hook M, formed of spring-wire formed into a coil at $m$, having a doubled member $m'$, terminating in a hook $m^2$, and the parallel members $m^3$, extending between the wires of the doubled member $m'$ and terminating back of the hook $m^2$ in coils $m^4$, the hook $m^2$ engaging the aperture $p$ from the inner side of the bent portion P' and the coils $m^4$ pressing against the concave side of the electrode, substantially as set forth.

5. The combination, with the case D, having attaching devices at its upper open end, and a water-proof pocket E in said case, provided with a closing-flap at its upper open end, of the battery-cells in the pocket E and having hooks on the copper and zinc plates of the end cells, provided with bends to pass over the upper edges of the ends of the case, and eyes or rings exterior to the case for connecting the circuit-wires, substantially as set forth.

6. The combination, with the battery and pocket for the same, of the hook having a bend to fit the pocket, said hook having one end connected with an element of the battery and the other end formed into a series of rings, substantially as described.

7. In a body-battery of the character described, the adjuster formed of spring-wire, said adjuster having one end formed into a hook to fit the battery-hinges, its central portion bent to fit over the battery-pocket, and its outer end provided with a series of rings, substantially as described.

8. In a body-battery of the character described, the combination, with the ringed hooks of the batteries and the perforated electrodes, of the connecting-wires and the spring-hooks attached to the wires, said hooks having an end coil, a doubled member extending from the end coil and terminating in a hook, and two spring members extending from the coil and through the doubled member, substantially as described.

9. The combination, with the battery, of a connecting-wire formed into a loop and the bead-like electrodes mounted on the loop, substantially as described.

JOHN A. CRISP.
GEORGE F. WEBB.

Witnesses:
E. L. LEMPSON,
W. D. HOWELLS, Jr.